United States Patent
Brzus

(10) Patent No.: US 9,188,166 B2
(45) Date of Patent: Nov. 17, 2015

(54) RETURN STOP

(71) Applicant: RINGSPANN GmbH, Bad Homburg (DE)

(72) Inventor: Augustyn Brzus, Nidda (DE)

(73) Assignee: Ringspann GmbH, Bad Homburg (DE)

( * ) Notice: Subject to any disclaimer, the term of this patent is extended or adjusted under 35 U.S.C. 154(b) by 285 days.

(21) Appl. No.: 13/719,352

(22) Filed: Dec. 19, 2012

(65) Prior Publication Data

US 2013/0161151 A1 Jun. 27, 2013

(30) Foreign Application Priority Data

Dec. 22, 2011 (DE) .......................... 10 2011 122 006

(51) Int. Cl.
  *F16D 7/02* (2006.01)
  *F16D 41/07* (2006.01)
  *F16D 47/02* (2006.01)

(52) U.S. Cl.
  CPC *F16D 7/02* (2013.01); *F16D 7/025* (2013.01); *F16D 41/07* (2013.01); *F16D 47/02* (2013.01)

(58) Field of Classification Search
  CPC ........ F16C 33/723; F16C 33/784; F16D 7/02; F16D 7/025; F16D 7/024; F16D 41/06; F16D 41/084; F16D 41/07; F16D 47/02; F16D 47/027
  USPC ............... 192/48.3, 48.92, 55.1, 45.1; 464/45
  See application file for complete search history.

(56) References Cited

U.S. PATENT DOCUMENTS

| | | | |
|---|---|---|---|
| 3,025,686 A * | 3/1962 | Lewis | ............................. 464/10 |
| 3,825,100 A | 7/1974 | Freeman | |
| 3,913,993 A | 10/1975 | Ernst | |
| 4,185,723 A | 1/1980 | Kelbel | |
| 4,425,989 A | 1/1984 | Gotoda | |
| 4,548,316 A * | 10/1985 | Maurer | ..................... 198/832.2 |
| 5,740,893 A | 4/1998 | Yamamoto | |

FOREIGN PATENT DOCUMENTS

| | | |
|---|---|---|
| DE | 2330126 | 1/1974 |
| DE | 2257861 | 5/1974 |
| DE | 3245347 | 7/1984 |
| DE | 19620131 | 11/1997 |
| DE | 10313572 | 10/2004 |
| DE | 19627013 | 6/2008 |

* cited by examiner

*Primary Examiner* — Edwin A Young
*Assistant Examiner* — Colby M Hansen
(74) *Attorney, Agent, or Firm* — Volpe and Koenig, P.C.

(57) ABSTRACT

A return stop limiting torque, particularly for conveyer systems, including an internal ring, a concentric external ring, and several retaining elements arranged in the annual gap between the rings, which allow a relative rotation between the rings in one direction, and block it in the other direction through form-fitting or frictional engagement. The external ring has friction areas at its radially extending faces, which can axially be clamped against the corresponding friction disks, with the friction disks being supported in a torque-proof fashion but at least partially axially displaceable. Here the external ring is divided into several axially adjacent partial rings, each being axially spaced from one another by an annular gap such that another friction disk is arranged respectively in this annular gap, which is supported in a torque-proof fashion but axially displaceable, and all of the partial rings and friction disks are axially clamped to each other.

16 Claims, 2 Drawing Sheets

RETURN STOP

INCORPORATION BY REFERENCE

The following documents are incorporated herein by reference as if fully set forth: German Patent Application no. DE 102011122006.6, filed Dec. 22, 2011.

BACKGROUND

The invention relates to a return stop limiting torque, which is embodied as a latch lock, roller free-wheel, clamp body free-wheel, or the like, particularly for conveyer systems, comprising an internal ring arranged on a drive shaft, an external ring embodied concentrically in reference thereto, and several retaining elements arranged in the annular gap between the internal and the external rings, which allow a relative rotation between the internal and the external rings in one direction, and block it in the other direction in a form-fitting fashion or by way of friction, with the external ring comprising friction-areas at its radially extending faces, which can be axially clamped against corresponding friction disks, with the friction disks being supported in a torque-proof fashion, but at least partially displaceable in the axial direction.

Such a return stop is known from DE 32 45 347 of the same applicant; its content is therefore included in the objective of the present application.

In the following discussion of the objective of the invention, for reasons of simplification, reference is made to a conveyer belt, without this being considered a restriction of the range of application of the invention.

In conveyer belts transporting upwards and using more than one drive pulley the load is evenly distributed over the pulleys during operation. However, when the loaded conveyer is stopped an uneven distribution of load develops when stiff return stops are used. The pulleys and the conveyer belt are unloaded during the run-down process. However, when the load is engaged, the drive pulley with the return stop engaging first is stressed to a greater extent, while the return stops of the other drive pulleys, due to the here developing belt strain, are subject to a considerably lower load. This can lead to excess load and destruction of the drives at the first drive pulley. Accordingly there is a need for a return stop which, when excess torque occurs, distributes said excess torque to the other drives by way of controlled slippage.

SUMMARY

This issue is addressed in the present case in that the external ring, together with the friction disks neighboring at both sides, is embodied as a type of disk brake, which when a predetermined brake moment is exceeded allows a limited rotation of the external ring and thus a certain return of the return stop. Here, the pre-stress between the two friction disks and the external ring is adjustable so that the braking effect of the return can be reduced in a defined fashion such that stress given in the conveyer belt or the drive train can be compensated.

In larger conveyer systems return stops with a greater braking effect and thus with stronger braking effect on the return can be attained.

In order to increase the brake moment of return stops it is already known to combine the external ring with a multiple-disk brake. Here, several blades are arranged on the cylindrical exterior area of the external ring in a torque-proof fashion, but axially displaceable, and torque-proof, axially displaceable blades engage between said blades, respectively radially from the outside. This way the friction area and the braking force acting upon the external ring are multiplied. However, here considerably more space is required: the multiple-disk brake leads to an almost doubling of the diameter of the free-wheel.

Based thereon, the present invention focuses on the objective to develop a return stop limiting torque, which is characterized in a relatively small design space and a considerably increased braking effect. Here, proven elements shall be used in the design so that high reliability is ensured. Last but not least the return stop according to the invention shall be characterized in a cost-effective construction.

This objective is attained according to the invention such that the external ring is divided into several axially adjacent partial rings, each of which is spaced apart from each other by an annular gap such that in this annular gap an additional friction disk is arranged, which is supported torque-proof but axially displaceable so that all partial rings and friction disks can be axially clamped in reference to each other.

The invention is here based on the acknowledgment that the multiple-disk brake is no longer attached outside the return stop but is embodied by the external ring itself by it being divided into so many axially adjacent partial rings that the friction area developing here can generate the desired braking moment. This also leads to an extremely compact design, because no additional structural space at all is required in the radial direction and in the axial direction only the friction disks in the annular gaps between the partial rings need a certain extension of the overall axial length.

A further development of the invention, which is particularly cost-effective, comprises that the internal ring of the return stop remains undivided so that all external partial rings cooperate with a single internal ring. Here, the production costs of the return stop are considerably reduced.

With regards to the retaining elements arranged in the annular gap, there is also the option for it to pass the annular gap undivided over all external partial rings. In the event of high demands given for the reaction of the return stop and for an even load distribution it is frequently preferred to also divide the retaining element into several retaining elements (arranged) successively in the axial direction spaced apart, particularly in the same fashion as the external ring being divided into partial rings so that each partial ring only cooperates with the retaining element allocated thereto.

With regards to the clamping of the partial rings and the friction disks it is most beneficial if they can be clamped uniformly in a single clamping process against a friction disk located at the end, which is fastened locally fixed, particularly embodied in the form of a fastening flange.

However, the scope of the invention also includes to provide the clamping not unilaterally against a friction disk provided at the end but from two sides against a friction disk arranged in the longitudinal center of the return stop, which is supported locally fixed or axially displaceable, but in any case supported in a torque-proof fashion. In this variant, a few adjacent partial rings are combined with their corresponding friction disks to form a first clamping package, the other partial rings and friction disks to a second clamping package, and both clamping packages are clamped against a friction disk arranged between the clamping packages.

If this friction disk arranged between the clamping packages is not only supported in a torque-proof fashion but also axially fixed, additionally the option develops to clamp both clamping packages independent from each other.

In most applications it is sufficient, though, to allocate all partial rings and friction disks to form a uniformly operating clamping package, which can be clamped against the friction disk located at the end, fixed to the housing. Then, a friction disk is provided at the other end of the return stop supported in a torque-proof fashion but axially displaceable, which via its axial ability for displacement causes the clamping of all partial rings and friction disks. This axially displaceable friction ring may beneficially be embodied such that it encases all partial rings like a housing.

The clamping of the friction disks is beneficially caused by a spring force, with the spring force being adjustable by changing said spring force.

In order to reduce the axial pre-stress the friction disk located at the end, which is axially displaceable, is displaced hydraulically or mechanically in the sense of a relaxation of the springs, thus opposite the clamping direction, namely in the application discussed here to such an extent that the torque load on the return stop of the conveyer belt causes the rotation of the external partial ring until the conveyer belt and/or the drive train have relaxed.

BRIEF DESCRIPTION OF THE DRAWINGS

Additional features and advantages of the invention are discernible from the following description of an exemplary embodiment and from the drawing; here it shows.

DETAILED DESCRIPTION OF THE PREFERRED EMBODIMENTS

Figure 1:
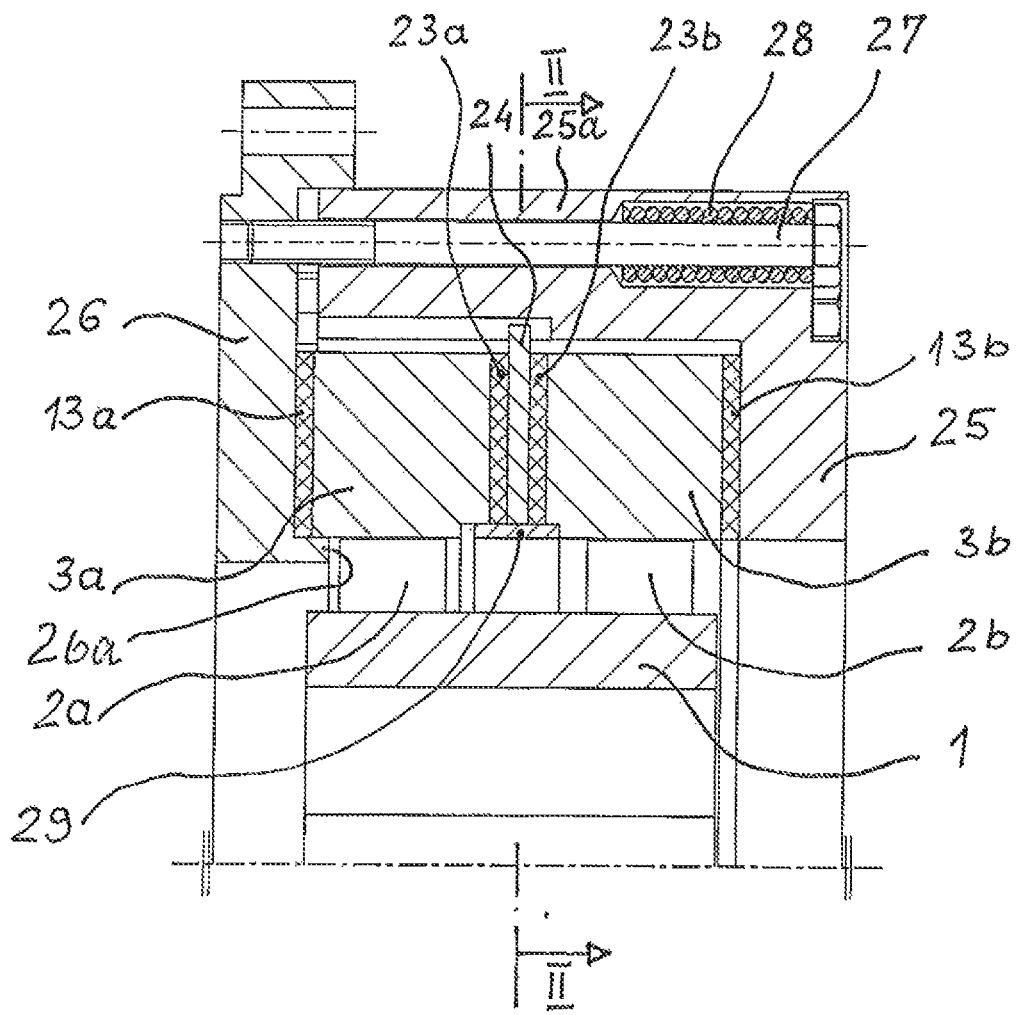
FIG. 1 an axial cross-section through the upper half of a return stop.

The return stop according to the invention comprises an internal ring 1, which is fastened in a form-fitting fashion for example via a feather key on a shaft, not shown. On its cylindrical external area two axially adjacent rows are arranged, comprising a plurality of retaining elements arranged successively in the circumferential direction in the form of tipping clamping elements 2a and/or 2b. These clamping elements are guided by lateral or central guiding elements in the axial direction as well as the circumferential direction, particularly by retainer rings, which are not shown here for reasons of clarity, such that they can perform a tipping motion in a manner known per se and this way increase or reduce their radial height. At their external radial circumference the two rows of clamping elements correspond to an external ring, which according to the invention comprise two partial rings 3a and 3b arranged axially at a distance from each other. Additionally, the partial rings 3a and 3b can be supported via rollers, not shown, on the common internal ring 1. These rollers may be arranged laterally next to the clamping elements 2a and 2b or in the circumferential direction between the clamping elements 2a and 2b and guided in their cage.

Here, it is essential that the partial rings 3a and 3b not only comprise friction areas 13a and 23a and/or 13b and 23b at their two external faces, extending radially, but also at their faces pointing towards each other and that in the interim space between the friction areas 23a and 23b facing each other a friction disk 24 is provided, which is mounted in a torque-proof fashion but axially displaceable in the return stop. For this purpose, with its external circumference the friction disk 24 engages in a form-fitting fashion the return stop with a torque-proof housing part 25a. This housing part 25a surrounds the partial rings 3a and 3b as well as their adjacent friction disks and can itself act as a friction disk 25 at its radial area facing the friction area 13b. It is connected in a torque-proof fashion but axially displaceable to a locally fixed housing flange, which can also act as a friction disk 26 at its radial area facing the friction area 13a. Here, the friction disk 25 is pre-stressed in the axial direction towards the housing flange carrying the friction disk 26 so that the partial rings 3a and 3b with their friction areas are compressed with the friction disk 24 arranged therebetween such that a strong braking effect is generated by the external ring of the return stop formed by the partial rings 3a and 3b.

In the exemplary embodiment the axial compression is generated by several screws 27 distributed about the circumference, which pass through the housing flange, which acts as a friction disk 26. Each of these screws 27 are surrounded at their end at the head by a compression spring 28, with its pre-stressing force pressing the friction disk 25 against the locally fixed friction disk 26.

Of course, the compression can also occur in a completely different fashion, for example as shown in DE 32 45 347.

The partial ring 3a is guided in the radial direction by a ring 26a, axially projecting form the friction disk 26, engaging under the partial ring 3a at its internal circumference.

The friction disk 24 is sufficiently guided in the radial direction by the above-described form-fitting engagement with the housing part 25a. The partial ring 3b however requires centering, which is embodied in the exemplary embodiment by a centering ring 29. This centering ring 29 passes the friction areas 23a and 23b as well as the friction disk 24 at the inside and carries the external rings 3a and 3b at their internal circumference. Of course, the centering ring 29 must allow the axial displacement of the partial rings 3a and 3b and the friction disk 24 interposed.

The centering of the partial ring 3b may be embodied, instead or additionally, also by a centering in the housing part 25, as shown by the ring 26a being in contact with the partial ring 3a. Another solution of the objective to center the partial rings 3a and 3b could be their support on the internal ring 1 with the help of rollers and bearings.

The friction areas 13a, 23a, 13b, and 23b are preferably embodied as independent coatings and adhered to the radial lateral areas of the partial rings 3a and/or 3b. However, the invention also includes to connect them to the friction disks 24, 25, 26 or to insert separate friction disks for this purpose. Alternatively, the friction areas can be formed by appropriately rough radial areas of the partial rings 3a, 3b and/or the housing parts 25, 26.

Figure 2:
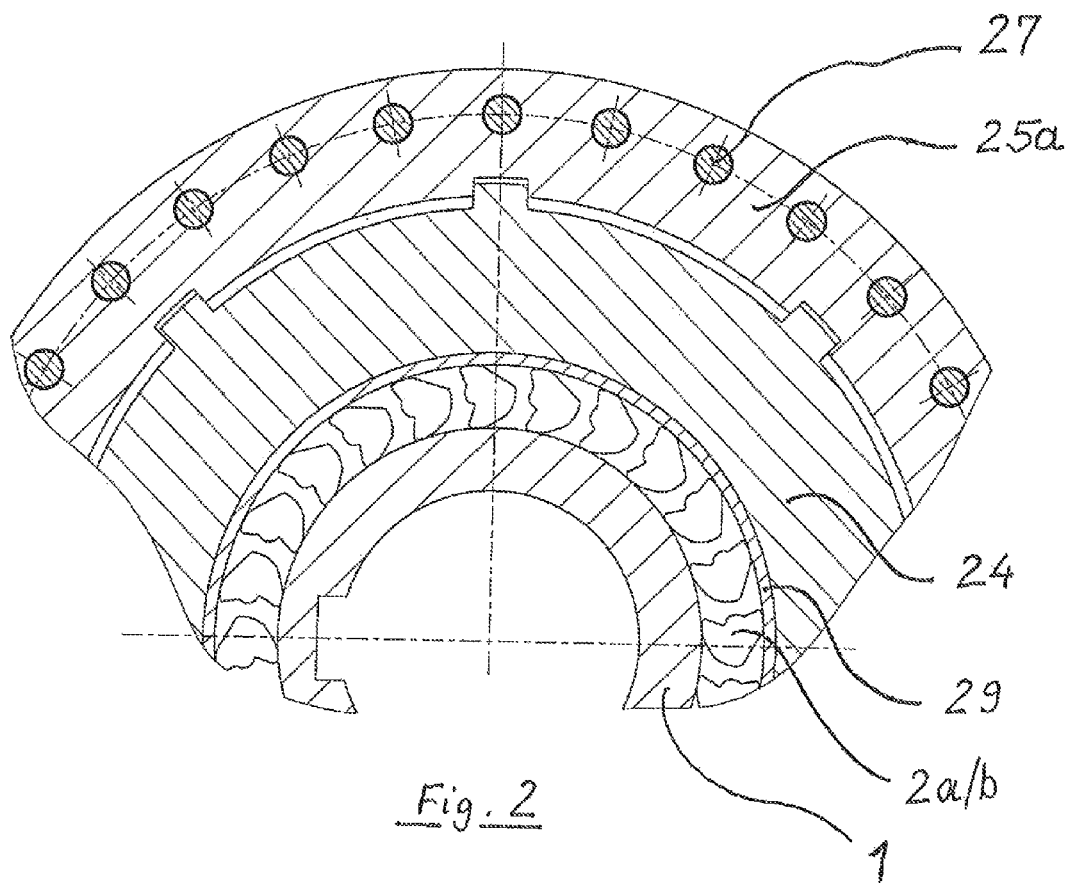
FIG. 2 a cross-section along the line II-II in FIG. 1.

The cross-section shown in FIG. 2 illustrates the arrangement of the clamping elements 2a and/or 2b, successive in the circumferential direction, between the internal ring 1 and one of the partial rings 3a or 3b. The clamping elements are preferably embodied and supported such that they lift off the external ring under the influence of centrifugal force, entrained by the rotating internal ring 1, so that no wear and tear occurs due to friction.

In FIG. 2 the partial rings 3a and/or 3b are not discernible due to this form of cross-section; here the torque-proof but axially displaceable connection between the friction disk 24 and the housing part 25a is disclosed.

In the exemplary embodiment the external ring is only divided into two partial rings 3a and 3b with one interposed friction disk 24. However, instead here a division into additional partial rings with (more) interposed friction disks is also possible when a higher braking force shall be generated at the external ring of the return stop.

Here, the invention has been shown with the positioning of the friction disk at the external ring. Of course, the scope of the invention also includes a cinematic inversion, which means the return stop is attached to a driven hub and the internal ring is divided into axially adjacent partial rings, between which one respective friction disk is arranged. In this case, the torque-proof support of the friction disks can also occur by a form-fitting engagement of a fixed axle penetrating the shaft.

The invention claimed is:

1. A return stop for limiting torque, comprising an internal ring (1) arranged on a drive shaft, an external ring (3a, 3b) concentric in reference thereto, and several retaining elements (2a, 2b) arranged in an annual gap between the internal and the external rings, which allow a relative rotation between the internal and the external rings in one direction, and blocking the relative rotation in the other direction by a form fit or frictional engagement of the retaining elements between the internal ring and the external ring, with the external ring (3a, 3b) comprising friction areas (13a, 13b) at faces thereof that extend approximately radially, said friction faces are axially clamped against corresponding outer friction disks (25, 26), with the outer friction disks (25, 26) being supported rotationally fixed but at least partially axially displaceable, the external ring is divided in radial planes into two or more axially adjacent sub-rings (3a, 3b), each of which is axially spaced from the other by an axial gap such that an inner friction disk (24) is arranged respectively in the axial gap between the sub-rings, said inner friction disk is supported rotationally fixed but axially displaceable, and all of the sub-rings (3a, 3b) and the outer and inner friction disks (24, 25, 26) are axially clampable to each other.

2. A return stop according to claim 1, wherein all of the external sub-rings (3a, 3b) cooperate with a common internal ring (1) via the retaining elements acting between the internal ring and the external ring.

3. A return stop according to claim 1, wherein the retaining elements (2a, 2b) each extend as a single piece across the axial gap between all of the sub-rings (3a, 3b) of the external ring.

4. A return stop according to claim 1, wherein the retaining elements (2a, 2b) are each divided into multiple sub-elements that correspond to the sub-rings (3a, 3b).

5. A return stop according to claim 1, wherein all of the sub-rings (3a, 3b) and the inner and outer friction disks (24, 25, 26) are uniformly clamped in a single clamping process against one of the outer friction disks (26) located at one axially outer end.

6. A return stop according to claim 5, wherein said one of the outer friction disks (26) is mounted fixed at said one axially outer end.

7. A return stop according to claim 5, wherein said one of the friction disks (26) located at the axially outer end acts as a fastening flange.

8. A return stop according to claim 1, wherein an axially displaceable one of the outer friction disks (25) is connected to a housing part (25a).

9. A return stop according to claim 1, wherein some adjacent ones of the sub-rings are combined with an adjacent one of the friction disks to form a first clamping package, and other ones of the sub-rings and a different adjacent one of the friction disks form a second clamping package, and both of the clamping packages are clamped against the inner friction disk that is arranged between the two clamping packages.

10. A return stop according to claim 1, wherein one of the outer friction disks (25), located at an axially outer end, is connected to the return stop axially opposite to a fixedly located one of the outer friction disks (26) but axially displaceable to the fixed one of the friction disks (26) and is loaded by springs (28) in a sense of a pre-loading of the inner and outer friction disks (24, 25, 26) and the sub-rings (3a, 3b).

11. A return stop according to claim 10, wherein the springs (28) are adjustable with regards to the pre-loading.

12. A return stop according to claim 10, wherein the axially displaceable one of the outer friction disks (25) is arranged in a housing (25a) surrounding the sub-rings (3a, 3b).

13. A return stop according to claim 1, wherein an axially displaceable one of the outer friction disks (25) is displaceable hydraulically or mechanically against springs (28) acting upon said axially displaceable one of the outer friction disks (25).

14. A return stop according to claim 1, wherein for centering purposes the sub-rings (3a, 3b) that are adjacent to one another engage an axially displaceable centering ring (29).

15. A return stop according to claim 1, wherein the inner friction disk (24) arranged in the axial gap carries at an inside thereof a centering ring (29), which in turn engages under the sub-rings (3a, 3b) and radially guides them.

16. A return stop according to claim 1, wherein the friction areas (13a, 13b, 23a, 23b) are formed by friction coatings connected fixed to the sub-rings (3a, 3b).

\* \* \* \* \*